(No Model.)
W. HINDHAUGH, Jr.
METHOD OF COATING COFFEE.
No. 394,181. Patented Dec. 11, 1888.
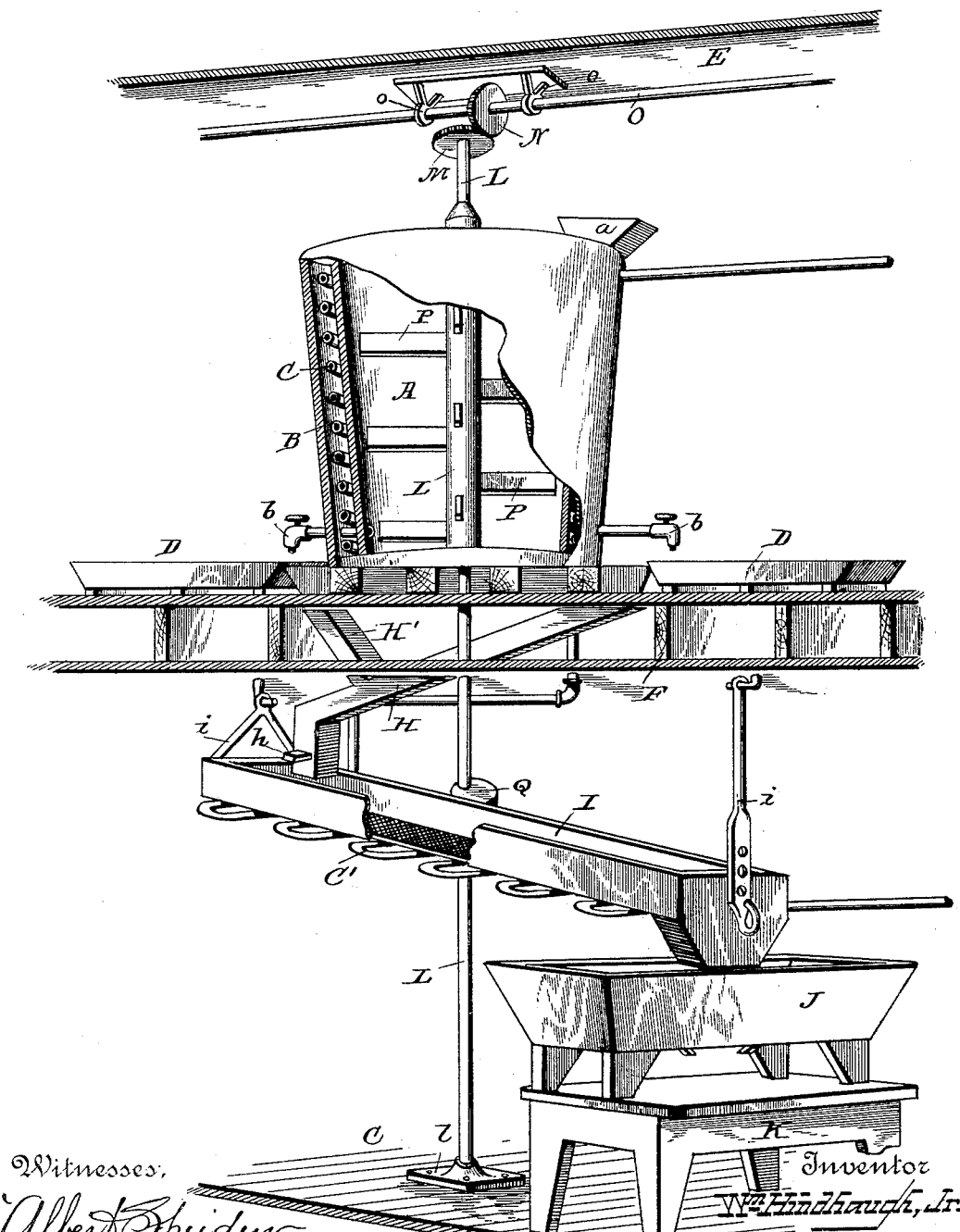

UNITED STATES PATENT OFFICE.

WILLIAM HINDHAUGH, JR., OF OSWEGO, NEW YORK.

METHOD OF COATING COFFEE.

SPECIFICATION forming part of Letters Patent No. 394,181, dated December 11, 1888.

Application filed May 7, 1888. Serial No. 273,127. (No model.)

*To all whom it may concern:*

Be it known that I, WILLIAM HINDHAUGH, Jr., a citizen of the United States of America, residing at Oswego, in the county of Oswego and State of New York, have invented certain new and useful Improvements in Method of Coating Coffee, of which the following is a specification, reference being had therein to the accompanying drawing.

My invention relates to an improved method of coating or glazing the grains of coffee with gelatine or isinglass for the purpose of preventing the loss of aroma, to which material may be added, if desired, some non-deleterious substance that will change the flavor of the coffee, or some other harmless substance that will change the color of the grains and give them a uniform color.

My method consists in first spreading the coffee out in a thin layer, then pouring the glazing material over it, then passing the coffee down a smooth inclined surface to even the glazing on the grains, and finally subjecting the coffee to a shaking action on a heated surface to uniformly dry the glazing.

In the accompanying drawing I have illustrated an apparatus well adapted for carrying out my method; but it is to be understood that no special mechanism is necessary, as each and every step of the process is susceptible of being carried out by hand.

Referring to the drawing, which is a perspective view, partly sectional and partly broken out, A represents a vessel in which the gelatine or isinglass is dissolved; and B represents a jacket for the vessel, between which jacket and the vessel there is a coiled steam-pipe, C, which leads from any suitable source of steam-supply. The vessel is provided with a lid, through an opening in which there is placed a hopper, $a$, through which the glazing material is fed to the vessel. There are also outlet-cocks $b$ near the bottom of the vessel for drawing off the material.

D represents shallow pans beneath cocks $b$, in which the coffee is placed to receive the coating.

E represents the ceiling of the second story of the building; F, the second floor, and G the first floor.

H is an inclined trough with a flat smooth bottom, which leads from the coffee-pans D on floor F down through said floor and discharges into another wide inclined trough, I, having a flat perforated metal bottom, trough H being provided at its lower end with a cut-off slide, $h$, for an obvious purpose; and H' represents another trough, similar to trough H, and leading into it from another set of pans D.

The steam-pipe C, after being coiled around vessel A, passes down through the floor of the building and is again coiled, as at C', to serve as a heater for trough I, which is suspended from the ceiling by hangers $i$ in such manner as to vibrate freely over the steam-coil.

J is a box for receiving the coffee after treatment, mounted on a table, K.

L represents a shaft passing vertically through the vessel A and reaching to the lower floor, where it is stepped in a bearing-plate, $l$, the upper end of said shaft bearing a bevel-wheel, M, which gears with another bevel-wheel, N, on a line-shaft, O, journaled in brackets $o$, secured to the ceiling E. That portion of this shaft which passes through vessel A is enlarged to serve as a hub for a series of radial arms or stirrers, P. A cam, Q, is secured on this shaft alongside of trough I, and against which the latter bears, as seen.

The manner in which my method of coating or glazing the coffee-grains is carried out will be manifest. The steam is first turned into coils C and C' to heat the vessels A and trough I. The gelatine or isinglass is then put into vessel A through the hopper, and shaft L put in motion. The heat from coil C tends to dissolve the gelatine or isinglass, and the revolving arms or stirrers P facilitate the operation. A thin layer of coffee-grains is then placed in each pan, after which just sufficient gelatine or isinglass is drawn off to cover the layer of coffee. The coffee is then raked out of the pans into the troughs H H', over whose smooth bottoms the grains roll to trough I in the room below, which rolling action serves to even the gelatine or isinglass on the grains and give them a polished appearance.

When the grains reach the vibrating trough I, they at once spread out over its wide perforated bottom, and the heat rising from coil C' dries the coating as the coffee passes down to the box.

Having thus described my invention, what I claim, and desire to secure by Letters Patent, is—

The method of coating or glazing coffee-grains above described, which consists in, first, spreading the coffee out in a thin layer, then pouring the glazing material over it, then passing the coffee down a smooth inclined surface to even the glazing on the grains, and, finally, subjecting the coffee to a shaking action on a heated surface to uniformly dry the glazing.

In testimony whereof I affix my signature in presence of two witnesses.

WILLIAM HINDHAUGH, JR.

Witnesses:
GEO. NOYES BURT,
BERNARD GALLAGHER.